BERTRAND & SAMES.
Plow-Colter.
No. 61,508. Patented Jan. 29, 1867.
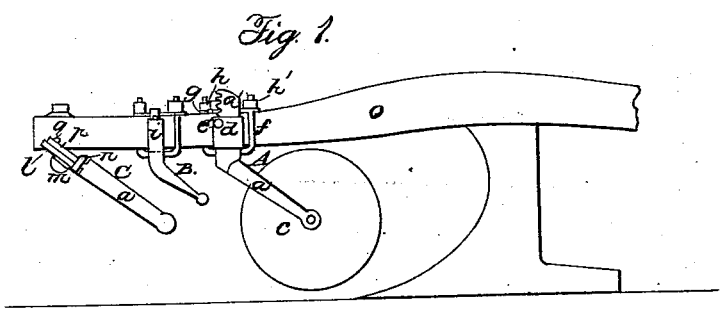
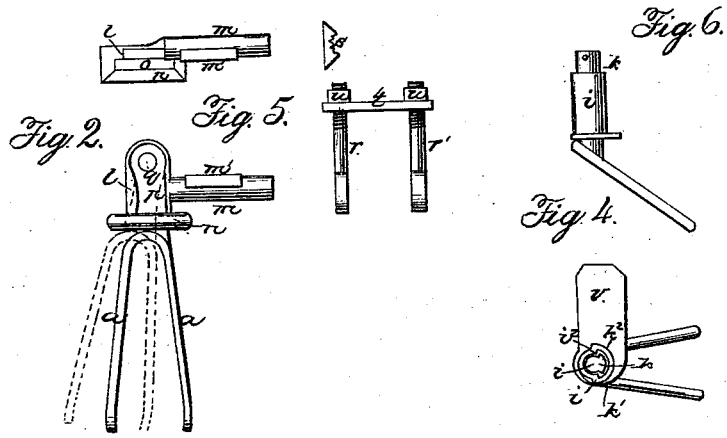
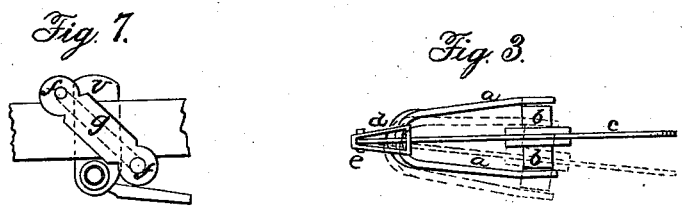
Witnesses:
J. J. Peyton
Theodore Laing
Inventors:
J. J. Bertrand
Peter Sames
by their Attys Baldwin & Son

United States Patent Office.

THEOPHILUS F. BERTRAND AND PETER SAMES, OF ROCKFORD, ILLINOIS.

Letters Patent No. 61,508, dated January 29, 1867.

IMPROVEMENT IN PLOUGHS.

The Schedule referred to in these Letters Patent and making part of the same.

TO ALL WHOM IT MAY CONCERN:

Be it known that we, THEOPHILUS F. BERTRAND and PETER SAMES, both of Rockford, in the county of Winnebago, and State of Illinois, have invented a new and useful Improvement in Ploughs, of which the following is a full, clear, and exact description, reference being had to the accompanying drawings, making part of this specification, in which—

Figure 1 represents, in a side elevation, a broken plough, with our invention applied to the beam in several modified forms.

Figure 2 represents one mode of using a coulter having a limited lateral vibration.

Figure 3 represents a second mode of limiting the lateral vibration of the coulter.

Figure 4 represents a third device by which the lateral vibration of the coulter may be governed; and Figures 5, 6, and 7 represent modes of adjusting the vibrating coulter and securing it rigidly to the plough.

It is the object of our invention, which has relation to improvements in the coulter for ploughs, to limit the lateral movement of the coulter, simplify its vertical adjustment, and secure the coulter rigidly to the plough, so as not to diminish the strength of the beam; and to this end our invention consists, first, in swivelling the coulter upon or within a bracket provided with guards which will limit its side vibration; second, in securing the bracket to the beam by embracing clamps; third, in giving the coulter a vertical adjustment by a rack-bar on its shank, so that its position can be changed with facility.

In the use of the swivelled coulter, which is free to turn around in its collar or in the beam, there arise many inconveniences in handling the plough to which it is attached; and besides, the liability to injure the team is considerable; but by our improvement we attain all the benefits of the swivelled coulter without any of the inconvenience or danger to which we have alluded.

To illustrate the first part of our invention, we have shown three modifications, which we will describe in the order that they are shown on the beam O in fig. 1, and marked A B C, respectively.

In modification A, a bifurcated standard, $a$, figs. 1 and 3, supports between its arms a short shaft, $b$, that carries the wheel coulter $c$. The standard $a$ is bent at an angle of about forty-five degrees, and its upper end terminates in a shank or flat bar, $a'$, of suitable strength, having a set of ratchet-teeth cut on its front edge. An angular or V-shaped box-socket, $d$, is firmly secured on one side and at a right angle to a flat bar strong enough to support the coulter and wide enough to be firmly secured to the beam by a clamp. The box-socket $d$ is narrow in front, but as wide as necessary at the rear to allow the shank $a'$ and the coulter $c$ to vibrate either side of the line of the furrow, as shown by the red lines in fig. 3, where the cutter has passed to the left side of the line in which the team is moving. The vibrations of the coulter are thus limited by the sides of the box-socket; but of course the width of the socket at the rear will be wide enough to allow all the vibration in the coulter required to realize the full benefit of the swivelled coulter. The vertical adjustment of the coulter, in this example, is effected by a screw or bolt, $e$, which passes through the front of the box-socket $d$ and between two of the teeth of the rack-bar, the teeth of the ratchet being strong enough to resist the pressure of the coulter when at work and to support it when out of the ground. Thus arranged, it is obvious that by removing the screw $e$ the coulter can be raised or lowered; and also, that by inserting the screw or bolt $e$, the coulter will be held as adjusted, and this without obstructing its lateral vibration. This modification of the coulter we attach to the beam by a single staple, $f$, which passes around the outside of the beam and embraces the flat bar attached to the side of the box-socket $d$. The staple $f$ is placed at an angle across the beam, and a plate, $g$, is punched to receive the ends of the staple, which terminate in screws having nuts, $h$ and $h'$, by which the plate $g$ is drawn tight on top of the beam. The box-socket and coulter are thus rigidly secured to the beam, which is left in its entirety, and not made weak or liable to decay from having holes through it; and to shift the coulter on the beam it is only necessary to relax the nuts which hold the staple, when, of course, the coulter can be easily and properly adjusted in any desired relation to the beam.

In modification B, we form the socket $i$ of two sections of tubes of different diameters, and solder them together, so as to leave the thickness of one tube raised above the other within the socket, where the edges of the smaller tube form shoulders, $i^1$ and $i^2$. The shank $k$ of the bifurcated standard $a$ is made of a form to correspond with the interior of the socket $i$, by having one portion reduced to a diameter less than the smaller portion of the socket, and the remaining portion of a larger diameter, but less than the larger tube out of which the socket $i$ is formed. At the intersection of the two sizes of the shank $k$, shoulders, $k^1$ and $k^2$, are formed; and when the shank $k$ is inserted within the socket $i$, the spaces between the shoulders $i^1$ and $i^2$ of the socket, and the shoulders $k^1$ and $k^2$ of the shank, determine the limit of the vibration of the coulter.

In the modification C, a plate, $l$, is secured to a rod, $m$; the plate $l$ having a flange, $n$, that is slotted, as at $o$. The bifurcated standard $a$ is attached securely to a plate or bar, $p$, of a less width than the slot $o$; and this bar, after being passed into the slot, is pivoted, at $q$, to the plate $l$; and thus the bifurcated standard is free to vibrate in the slot $o$, and of course the distance that the coulter may vibrate is determined by the difference between the width of the bar or plate $p$ and the width of the slot $o$. In the use of modification C, we employ two straps or screw-rods, $r$ and $r^1$, punched at their lower ends to receive the rod $m$, which is grooved longitudinally on its upper side, the grooves being cut in a raised portion, $m^1$, of the rod $m$. A grooved step, $s$, of triangular outline, is made to rest with its flat side across the under side of the beam O; and the grooves $m^1$ of the rod $m$ are placed within the step. The screws on the bolts $r$ and $r^1$ are provided with a punched strap, $t$, and nuts, $u$ and $u^1$; and when the nuts are screwed down the coulter is firmly held in place without diminishing the strength of the beam. To adjust the coulter to a distance nearer to or further from the beam, the nuts $u$ and $u^1$ are loosened, and the grooves on the bar $m$ are changed to match other grooves in the step $s$; and of course when the nuts are again tightened the coulter will receive its new adjustment. It is also manifest that by shifting the pivot $q$ up or down on the plate $l$, the coulter can be raised or lowered any distance desired. In fig. 7 we have shown the mode first described of fastening the coulter having a flat bar to the beam. In fig. 7 the ends of the staple pass through the flat plate $g$, that rests on top of the beam and serves as a washer; the lower part of the staple being shown in dotted lines, passes at an angle beneath the beam; and the flat bar $v$, to which the bifurcated standard is secured, is thus held on opposite sides at right angles to the beam.

We have described the coulter as a rolling one, and only shown such in the drawings; but of course our improvements are all equally applicable to a curved cutting coulter, the vibrations of which, adjustment and fastening thereof to the beam, would be identical with the same provisions for the rolling coulter.

What we claim as our invention, and desire to secure by Letters Patent, is—

1. A vibrating coulter, when limited in its vibrations, substantially in the manner and for the purpose set forth.

2. Adjusting the coulter vertically, substantially in the manner and for the purpose described.

In testimony whereof we have hereunto subscribed our names.

T. F. BERTRAND,
PETER SAMES.

Witnesses:
    DUNCAN FERGUSON,
    MARCUS S. PARMELE.